(12) United States Patent
Jin et al.

(10) Patent No.: US 12,146,396 B2
(45) Date of Patent: Nov. 19, 2024

(54) GEOMECHANICAL APPLICATIONS USING BIOTS COEFFICIENT BASED ON ADVANCED DOWNHOLE LOGGING MEASUREMENTS

(71) Applicant: Baker Hughes Oilfield Operations LLC, Houston, TX (US)

(72) Inventors: Guodong Jin, Houston, TX (US); Syed Shujath Ali, Houston, TX (US); Glen Murrell, Houston, TX (US); Umesh Prasad, Houston, TX (US); Seehong Ong, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/343,302

(22) Filed: Jun. 9, 2021

(65) Prior Publication Data

US 2021/0381354 A1    Dec. 9, 2021

Related U.S. Application Data

(60) Provisional application No. 63/036,804, filed on Jun. 9, 2020.

(51) Int. Cl.
*G01V 3/38*        (2006.01)
*E21B 43/16*    (2006.01)
(Continued)

(52) U.S. Cl.
CPC ............ *E21B 43/26* (2013.01); *E21B 43/162* (2013.01); *E21B 47/06* (2013.01); *G01V 1/303* (2013.01); *G01V 3/32* (2013.01); *G01V 3/38* (2013.01)

(58) Field of Classification Search
CPC ........ E21B 43/12; E21B 43/26; E21B 43/162; E21B 47/06; E21B 49/008; G01N 24/08;
(Continued)

(56) References Cited

U.S. PATENT DOCUMENTS 9,176,250 B2 *   11/2015  Sinha .................... E21B 47/107
10,073,182 B2 *    9/2018  Gu .......................... G01V 1/282
(Continued)

OTHER PUBLICATIONS

Tan, Xin, and Heinz Konietzky. "Numerical Study of Variation in Biot's Coefficient with Respect to Microstructure of Rocks." Tectonophysics 610 (2014): 159-171. (Year: 2014).*
(Continued)

*Primary Examiner* — Alvaro E Fortich
*Assistant Examiner* — Martin Walter Braunlich
(74) *Attorney, Agent, or Firm* — Hogan Lovells US LLP

(57) ABSTRACT

Methods and systems include using downhole data to determine a static bulk modulus of dry rock or rock frame in a porous formation and determine a static bulk modulus of grain minerals in the porous formation. Biot's coefficient for the porous formation can be determined based on the static bulk modulus of dry rock or rock frame and the static bulk modulus of grain minerals. Effective stress of the porous formation can be determined based on Biot's coefficient. Effective stress of the porous formation is used in geomechanical applications, including hydraulic fracturing, wellbore stability analysis, and reservoir integrity assessments.

21 Claims, 6 Drawing Sheets

(51) Int. Cl.
  *E21B 43/26* (2006.01)
  *E21B 47/06* (2012.01)
  *G01V 1/30* (2006.01)
  *G01V 3/32* (2006.01)

(58) Field of Classification Search
  CPC . G01V 1/28; G01V 1/50; G01V 1/282; G01V 1/303; G01V 3/32; G01V 3/38
  See application file for complete search history.

(56) References Cited

U.S. PATENT DOCUMENTS

| | | | | |
|---|---|---|---|---|
| 10,436,027 | B2 * | 10/2019 | Kampfer | E21B 49/008 |
| 10,513,923 | B2 * | 12/2019 | Coenen | G06F 30/20 |
| 10,613,250 | B2 * | 4/2020 | Prioul | G01N 29/04 |
| 11,486,244 | B2 * | 11/2022 | Liu | E21B 49/005 |
| 2016/0003020 | A1 * | 1/2016 | Sharma | E21B 43/267 |
| | | | | 166/308.1 |
| 2017/0058668 | A1 | 3/2017 | Paul | |
| 2018/0058212 | A1 | 3/2018 | Ali | |
| 2018/0258762 | A1 | 9/2018 | Kampfer | |

OTHER PUBLICATIONS

International Search Report and Written Opinion mailed Sep. 17, 2021 in corresponding PCT Application No. PCT/US2021/036637.
Stadtmuller et al., "Petrophysical and Geomechanical Analysis of the Lower Paleozoic Shale Formation, North Poland," Aug. 2, 2018, Interpretation, vol. 6, No. 6, p. 1-50.
Fang et al., "Modeling of Biot's coefficient for a clay-bearing sandstone reservoir," Jun. 18, 2018, Arabian Journal of Geosciences, vol. 11, No. 302, p. 1-17.

* cited by examiner

GEOMECHANICAL APPLICATIONS USING BIOTS COEFFICIENT BASED ON ADVANCED DOWNHOLE LOGGING MEASUREMENTS

CROSS REFERENCE TO RELATED APPLICATIONS

This application claims priority to U.S. Patent Application No. 63/036,804 filed Jun. 9, 2020 titled "METHOD FOR ESTIMATING BIOTS COEFFICIENT FROM ADVANCED DOWNHOLE LOGGING MEASUREMENTS", the disclosure of which is incorporated herein by reference in its entirety.

BACKGROUND

Porous formations, such as shale formations, are increasingly important for oil and gas exploration and production. Accordingly, there is a need to understand the various stresses in porous formations and to develop industrial applications based on these stresses. For example, drilling and hydraulic fracturing operations require an understanding of the stresses in porous formations.

SUMMARY

Applicant recognized the above problems and developed methods and systems disclosed herein. Embodiments are disclosed to fracture porous formations based on the effective stress of the formations. For example, methods include the steps of determining a static bulk modulus of dry rock or rock frame in a porous formation from downhole data and determining a static bulk modulus of grain minerals in the porous formation from downhole data. In embodiments Biot's coefficient for the porous formation is determined based on the static bulk modulus of dry rock or rock frame and the static bulk modulus of grain minerals. The effective stress of the porous formation can be determined based on Biot's coefficient for the porous formation. The effective stress can be determined by subtracting the product of Biot's coefficient and the pore pressure from the total stress for the formation.

In embodiments, a system can include one or more hydraulic fracturing pumps to pump fluid into a porous formation at a specified pumping pressure. The system can include at least one processor and computer memory with instructions to cause the system to carry out the steps of the methods disclosed herein. When the effective stress of a porous formation is determined, the effective stress can be used to set the pumping pressure for the one or more hydraulic fracturing pumps. The effective stress of the formation can also be used in other geomechanical applications, including, for example, performing wellbore stability analyses and reservoir integrity assessments.

BRIEF DESCRIPTION OF THE DRAWINGS

Various embodiments in accordance with the present disclosure will be described with reference to the drawings, in which.

DETAILED DESCRIPTION

Figure 1:
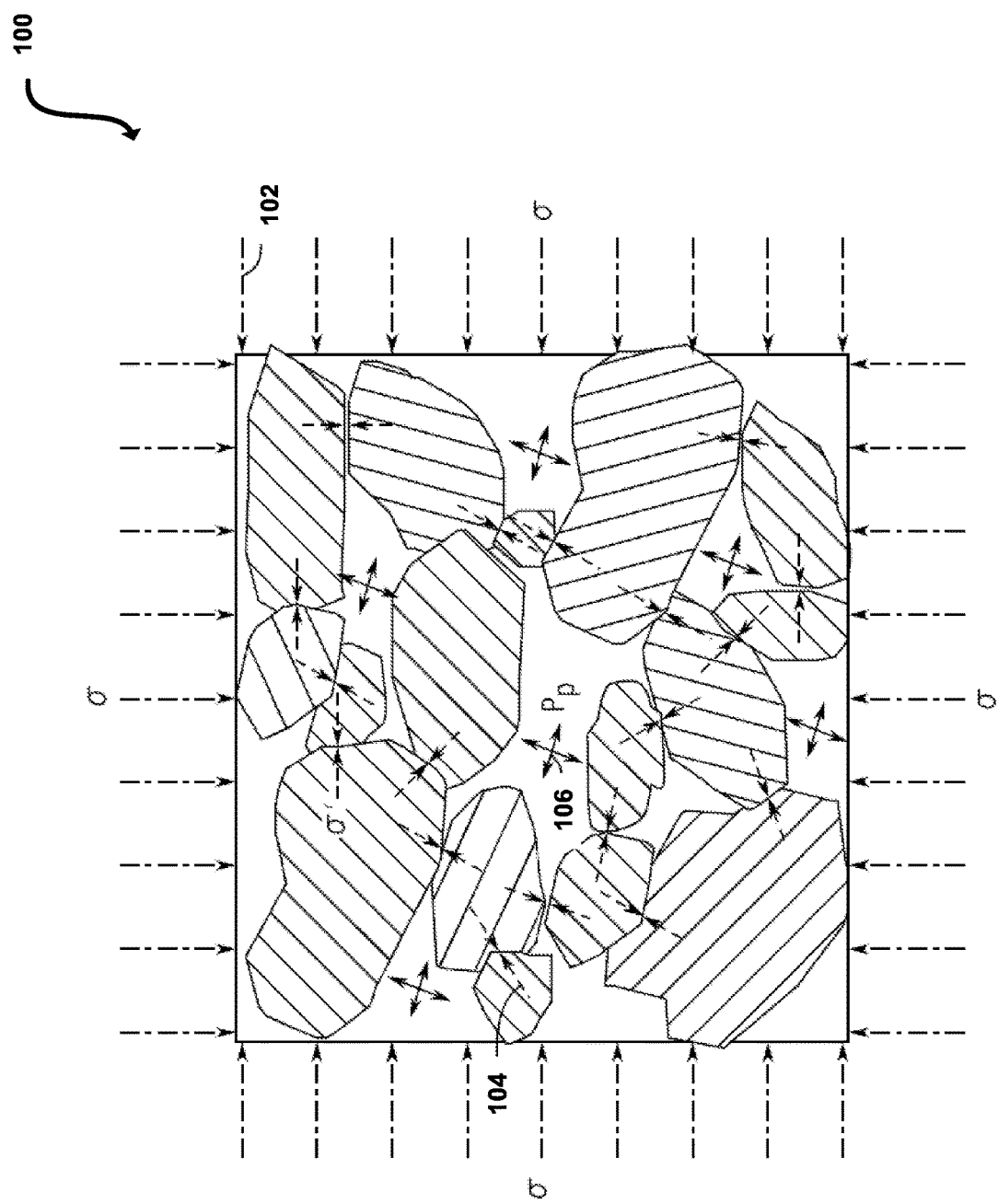
FIG. 1 illustrates an example porous formation.

In the following description, various embodiments will be illustrated by way of example and not by way of limitation. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Hydraulic fracturing (sometimes referred to as "fracing" or "fracking") is a method to extract hydrocarbons from a porous formation. The effectiveness of hydraulic fracturing depends in part on certain properties of the porous formation. For example, the failure behavior of a formation is based at least in part on the effective stress within the formation. Thus, determining the effective stress accurately is an important part of hydraulic fracturing design. Accurate determination of effective stress also plays an important role in wellbore stability analysis and reservoir integrity assessment during drilling, completion, and production.

One method of determining effective stress is based on other properties, namely the overburden stress and pore pressure of a formation. Biot's coefficient is used to determine the effective stress based on the overburden stress and pore pressure. However, others have had difficulty accurately determining Biot's coefficient. As a result, effective stress is not known with accuracy, which causes further problems with hydraulic fracturing design and other applications as described above. An accurate determination of Biot's coefficient is useful for these applications and other geomechanical applications.

Improved drilling and hydraulic fracturing methods are disclosed. Methods are disclosed for logging downhole measurements and determining Biot's coefficient from the measurements. Downhole logging measurements include, for example, acoustic wave velocities, mineralogy, and nuclear magnetic resonance (NMR) logging.

In embodiments, acoustic velocity measurements can be used to determine the static bulk modulus of a rock frame or dry rock through frequency transfer functions and static and dynamic bulk moduli correlation functions. The acoustic velocity measurements can first be used to determine the dynamic bulk modulus. The dynamic values can then be corrected for frequency if measured by ultrasonic or seismic devices or logs. The resulting values can then be converted to static values.

In embodiments, mineralogical and NMR measurements are used to determine the grain bulk modulus. The mineralogical measurements can be used to determine the volumetric amount of each mineral, and the NMR measurements can be used to determine diagenetic clay characteristics.

In Equation 1, Biot's coefficient ($\alpha$) is employed to determine the effective stress ($\sigma'$) from the externally applied total stress ($\sigma$) and pore pressure ($P_p$):

$$\sigma' = \sigma - \alpha P_p = \sigma - \left(1 - \frac{K_{frm,S}}{K_{g,S}}\right) P_p \quad \text{Equation 1}$$

In Equation 1, $K_{frm,S}$ represents the static bulk modulus of the rock frame or dry rock and $K_{g,S}$ represents the static bulk modulus of grains, or forming minerals, from which the rock is composed. Symbol 'S' in Equation 1 denotes "static."

FIG. 1 illustrates an exemplary porous formation 100. The externally applied total stress (σ) 102 is shared between the rock frame and pore fluids in subsurface formations. The external total stress 102 can represent any applied exterior stress. When a fluid fills the pores, or voids, in a porous formation 100, the pressure in the pores can be measured. The pore pressure ($P_p$) 106 in FIG. 1 represents this pressure.

The effective stress (σ') 104, not externally applied total stress (σ) 102, governs the failure behavior of subsurface formations. The effective stress 104 represents the stress acting on the grain and plays an important role in many engineering applications, including wellbore stability analysis, hydraulic fracturing design, and reservoir integrity assessment during drilling, completion, injection, and production. Therefore, the determination of Biot's coefficient has multiple geomechanical applications.

Methodologies disclosed herein allow for the determination of Biot's coefficient in the field using downhole logging measurements, which improves the design and performance of engineering operations, such as drilling and hydraulic fracturing. The determination can be made in near real time, and adjustments to drilling, completion, and stimulation operations can occur in the field.

Returning to Equation 1, Biot's coefficient can be determined by first determining two moduli: the static bulk modulus of the rock frame ($K_{frm,S}$) and the static bulk modulus of grain minerals ($K_{g,S}$). These two values can be measured through hydrostatic compression tests on the rock sample in the laboratory: rock frame bulk modulus can be measured by performing a hydrostatic compression test on a jacketed sample with zero pore pressure, and grain mineral bulk modulus can be measured by performing a hydrostatic compression test on an unjacketed sample, where the pore and confining pressure are equal. Values from hydrostatic testing are called static bulk moduli.

According to embodiments, the static bulk moduli can be determined using downhole measurements in the field, without lab testing. For example, downhole acoustic velocity measurements provide a way to determine the dynamic bulk modulus ($K_{DH,d,Sat}$) of a rock at fully fluid-saturated condition (denoted as Sat) as provided in Equation 2:

$$K_{DH,d,Sat} = \rho_{B,Sat}(V_{P,Sat})^2 - 4/3 \rho_{B,Sat}(V_{S,Sat})^2 \quad \text{Equation 2}$$

In Equation 2, $V_{P,Sat}$ and $V_{S,Sat}$ respectively represent the compressional and shear wave velocities respectively, and $\rho_{B,Sat}$ represents the bulk density of a fully fluid-saturated rock. Symbol d denotes dynamic. Formation rock can be saturated with various types of fluids (e.g., water, oil and water, gas and water; or gas, oil, and water) at downhole in-situ conditions of high temperature and pressures, resulting in the frequency dispersion effect on downhole wave velocity measurements. In embodiments, Equation 2 is applied to the dry frame because rock mechanical properties are intrinsic properties and should not be influenced by fluids in the void. Fluid stripping can be performed and the dry frame's acoustic velocity can be used for the calculations.

Figure 2:
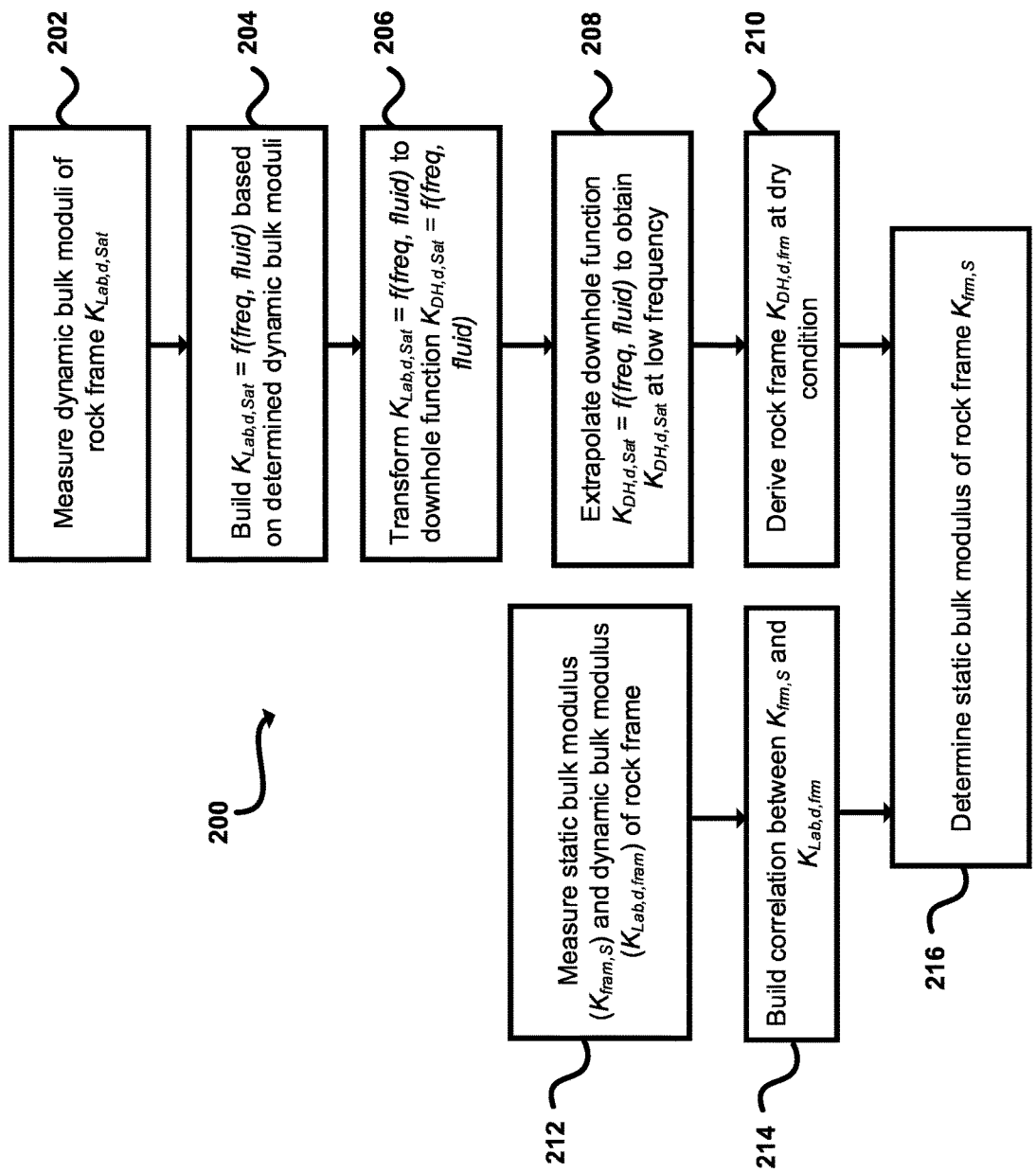
FIG. 2. illustrates an example method for determining a rock frame bulk modulus.

According to embodiments, the downhole dynamic bulk modulus ($K_{DH,d,Sat}$) needs frequency correction and a transform applied to the rock frame bulk modulus ($K_{frm,S}$) for the determination of Biot's coefficient. In embodiments, transform functions are used to convert downhole dynamic bulk modulus to static rock frame bulk modulus. FIG. 2 illustrates such an exemplary method.

FIG. 2 illustrates an exemplary method 200 for determining the static bulk modulus of rock frame. As illustrated in FIG. 2, the dynamic bulk moduli of the rock frame is measured 202. The function $K_{Lab,d,Sat}=f(\text{freq, fluid})$ is built based on the previously determined dynamic bulk moduli 204. This function is then transformed to downhole function $K_{DH,d,Sat}=f(\text{freq, fluid})$ 206. Extrapolating the downhole function yields the downhole function at low frequency 208. The dynamic bulk modulus $K_{DH,d,frm}$ of rock frame at dry conditions can then be derived 210. The method further includes measuring the static bulk modulus and dynamic bulk modulus of the rock frame 212 and building the correlation between the static bulk modulus and dynamic bulk modulus of the rock frame 214. The static bulk modulus of the rock frame $K_{frm,S}$ can be determined based on the correlation between $K_{Lab,d,frm}$ and $K_{frm,S}$ built from laboratory measurements and the determined dynamic bulk modulus 216.

Figure 3:
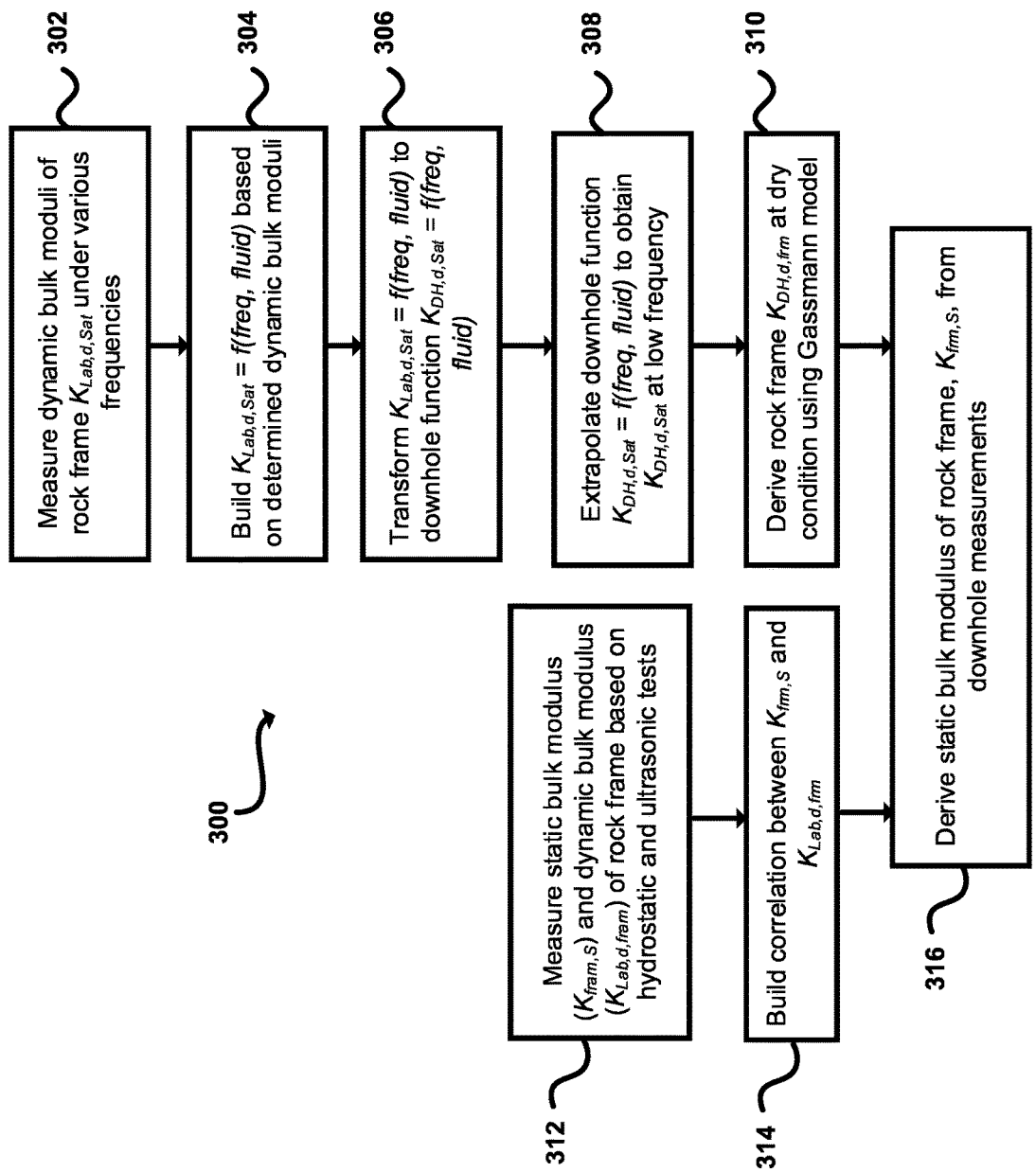
FIG. 3 illustrates an example method for determining a rock frame bulk modulus.

FIG. 3 illustrates another exemplary method 300 for determining the static bulk modulus of rock frame. First, the dynamic bulk moduli of the rock frame $K_{Lab,d,Sat}$ is measured under various frequencies 302. A function $K_{Lab,d,Sat}=f(\text{freq, fluid})$ is built from laboratory dynamic bulk modulus measurements on fully saturated rocks to form the relationship between the dynamic bulk modulus and frequencies applied 304. Then, the function $K_{Lab,d,Sat}=f(\text{freq, fluid})$ is transformed or adjusted to obtain the downhole function $K_{DH,d,Sat}=f(\text{freq, fluid})$ based on downhole dynamic bulk modulus measurements, which corrects the effect of other factors such as temperature and pressure on the bulk modulus 306.

Dynamic bulk modulus $K_{DH,d,Sat}$ at low frequency (LF) is extrapolated from the function $K_{DH,d,Sat}=f(\text{freq, fluid})$ 308. Then, the dynamic bulk modulus $K_{DH,d,frm}$ of rock frame or dry rock can be derived using Gassmann fluid substitution model or other available models 310. The dynamic bulk modulus $K_{DH,d,frm}$ of rock frame or dry rock is assumed to be the same as laboratory dynamic bulk modulus $K_{Lab,d,frm}$. The dynamic bulk modulus $K_{Lab,d,frm}$ and static bulk modulus $K_{frm,S}$ of the rock frame are measured, for example based on hydrostatic and ultrasonic tests 312. The correlation between $K_{Lab,d,frm}$ and $K_{frm,S}$ is built from these measurements 314. The static bulk modulus $K_{frm,S}$ is obtained from the correlation 316.

Figure 4:
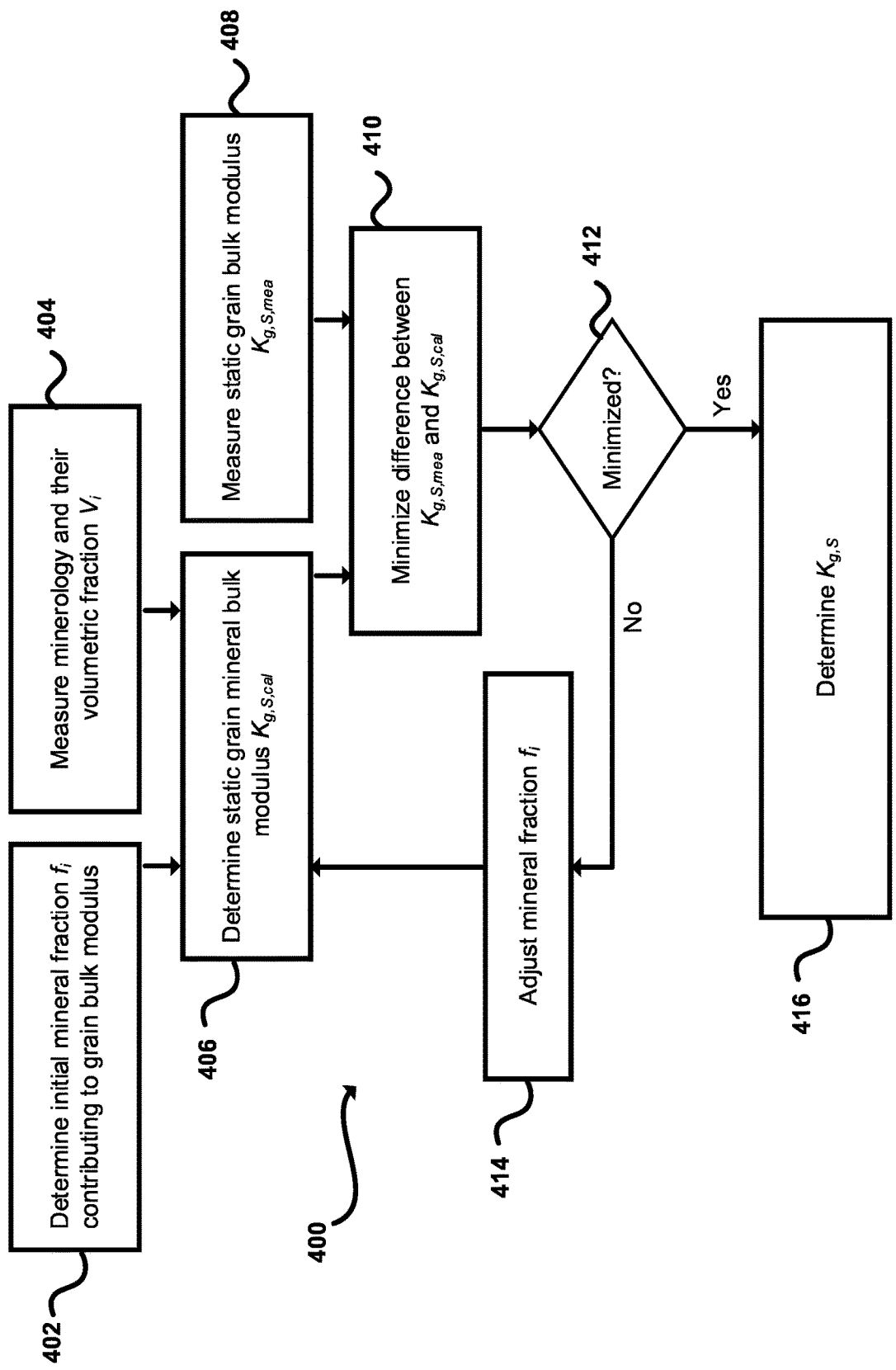
FIG. 4 illustrates an example method for determining a grain bulk modulus.

FIG. 4 illustrates an exemplary method 400 to determine the grain bulk modulus $K_{g,S}$. Exemplary methods include the step of determining an initial mineral fraction $f_i$ contributing to the grain bulk modulus 402 and measuring the volumetric fraction of the various minerals 404. The static grain mineral bulk modulus can be determined from based on these inputs 406. In addition, the static grain bulk modulus can be measured 408. The difference between the calculated static grain mineral bulk modulus and the measured static grain bulk modulus can be minimized 410, as discussed in more detail below. A determination can be made if this difference is minimized 412. If so, the grain bulk modulus can be derived 416. If not, the mineral fraction $f_i$ can be adjusted 414. The static grain mineral bulk modulus can be redetermined 406 and the difference between the determined static grain mineral bulk modulus and the measured static grain bulk modulus attempted to be minimized again 410. This loop can be repeated until a minimum is achieved and the grain bulk modulus derived 416.

Figure 5:
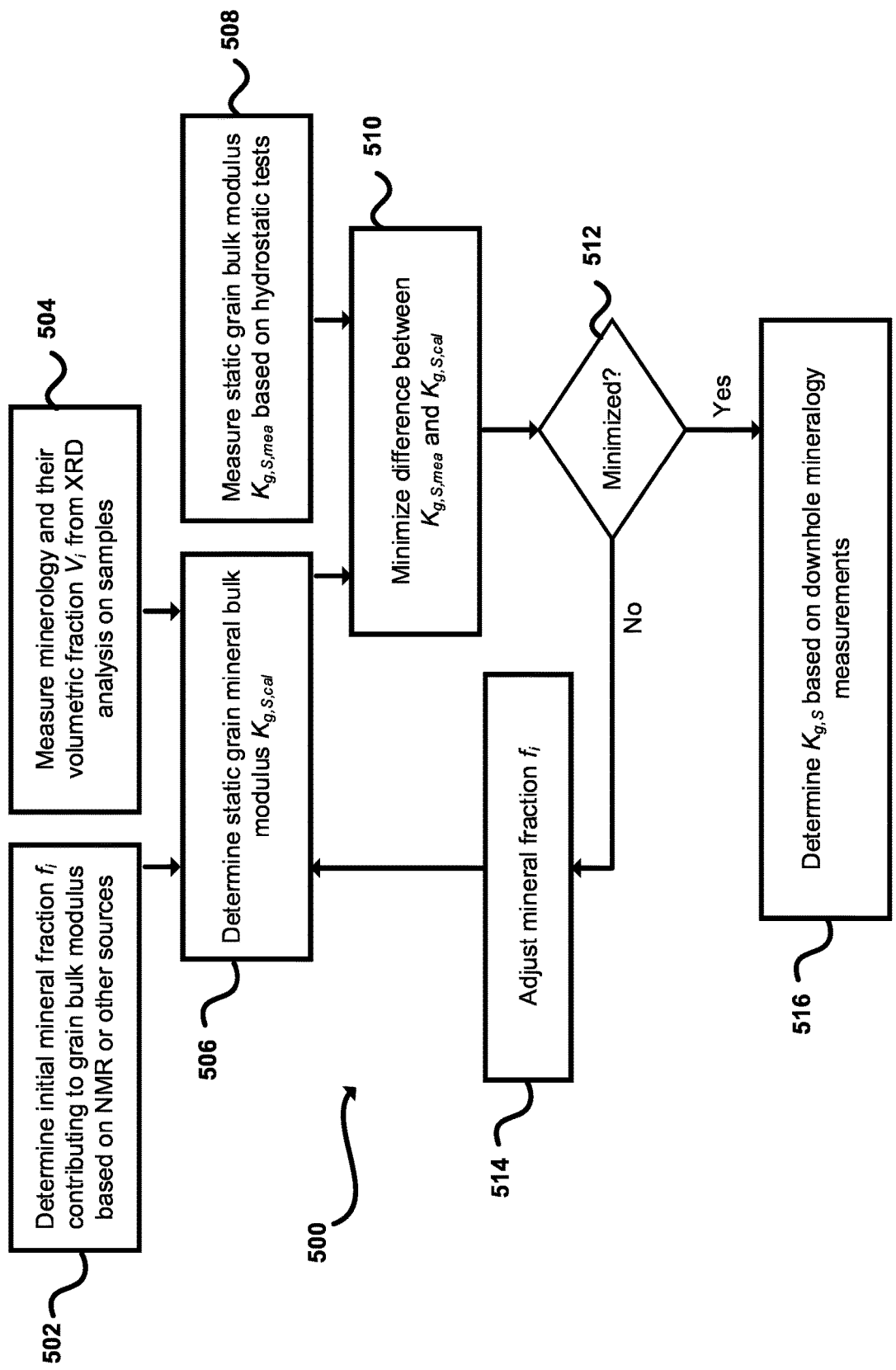
FIG. 5 illustrates an example method for determining a grain bulk modulus.

FIG. 5 illustrates another exemplary method 500 to determine the grain bulk modulus. In embodiments, the initial mineral fraction $f_i$ contributing to the grain bulk modulus is determined based on NMR or other sources 502. The mineralogy and volumetric fraction $V_i$ or weight fraction of minerals in the formation can be measured with X-ray diffraction XRD analysis on samples from the formation. In other words, the grain bulk modulus may have as an input the mineralogical measurements or XRD analysis on rock materials (core samples or drill cuttings for example) and their diagenetic clay characteristics. Such embodiments represent an improvement, among other reasons, due to the difficulties measuring and calculating the grain bulk modulus, particularly for certain rock mineralogical compositions.

The grain bulk modulus of a mixture of different minerals is often difficult to determine. Such a determination can depend on the volumetric fraction of each mineral component. For example, the Voigt (V) and Reuss (R) methods give the theoretical maximum ($K_{g,s}^V$) and minimum ($K_{g,s}^R$) grain bulk moduli of a mixture of n minerals as $$K_{g,s}^V = \sum_{i=1}^{n} V_i K_i \qquad \text{Equation 3}$$

$$K_{g,s}^R = \left(\sum_{i=1}^{n} \frac{V_i}{K_i}\right)^{-1} \qquad \text{Equation 4}$$

where i=1, 2, . . . , n are the minerals composed of rock; $V_i$ and $K_i$ are the volumetric fractions and bulk modulus of the $i^{th}$ mineral, respectively. Symbol 's' denotes static bulk modulus.

In embodiments, the grain bulk modulus is determined based on the characteristics of each mineral in the rock as:

$$K_{g,s,cal} = \sum_{i=1}^{n} f_i V_i K_i \qquad \text{Equation 5}$$

$$\min(|K_{g,s,cal} - K_{g,s,mea}|) = \min(\Sigma_{j=1}^{m} |(\Sigma_{i=1}^{n} f_i V_i K_i)_j - K_{g,s,mea,j}|) \qquad \text{Equation 6}$$

where $K_{g,s,mea,j}$ is the measured static grain bulk moduli of jth core sample, and $f_i$ is the fraction (0 to 1.0) of mineral i which contributes to the grain bulk modulus of a mineral mixture. Clay minerals can be diagenetic and detrital (or structural). Their contribution to grain bulk moduli may be different, represented by the fraction of each mineral $f_i$. The fraction of diagenetic minerals can be derived from NMR logging measurements and neutron-gamma spectroscopy downhole measurements (or XRD analysis).

The static grain mineral bulk modulus $K_{g,s,cal}$ can be determined based on the mineral fraction and volumetric fraction 506, for example using Equation 5 above. The static grain bulk modulus $K_{g,s,mea}$ can be based on hydrostatic tests 508. The difference between the measured and calculated values, respectively $K_{g,s,mea}$ and $K_{g,s,cal}$ can be minimized 510, for example using Equation 6 above. If confirmed to be minimized 512, then the grain bulk modulus $K_{g,s}$ has been determined based on downhole mineralogy measurements 516. If not minimized, then the mineral fraction can be adjusted 514, and the loop repeated as described above until the between $K_{g,s,mea}$ and $K_{g,s,cal}$ is minimized.

The disclosed methods provide accurate determinations of the static bulk modulus of the rock frame or dry rock $K_{frm,S}$ and the static bulk modulus of grains $K_{g,S}$. Biot's coefficient can be derived from these determinations, for example by using Equation 1 above. Biot's coefficient can be used in numerous geomechanical applications.

Figure 6:
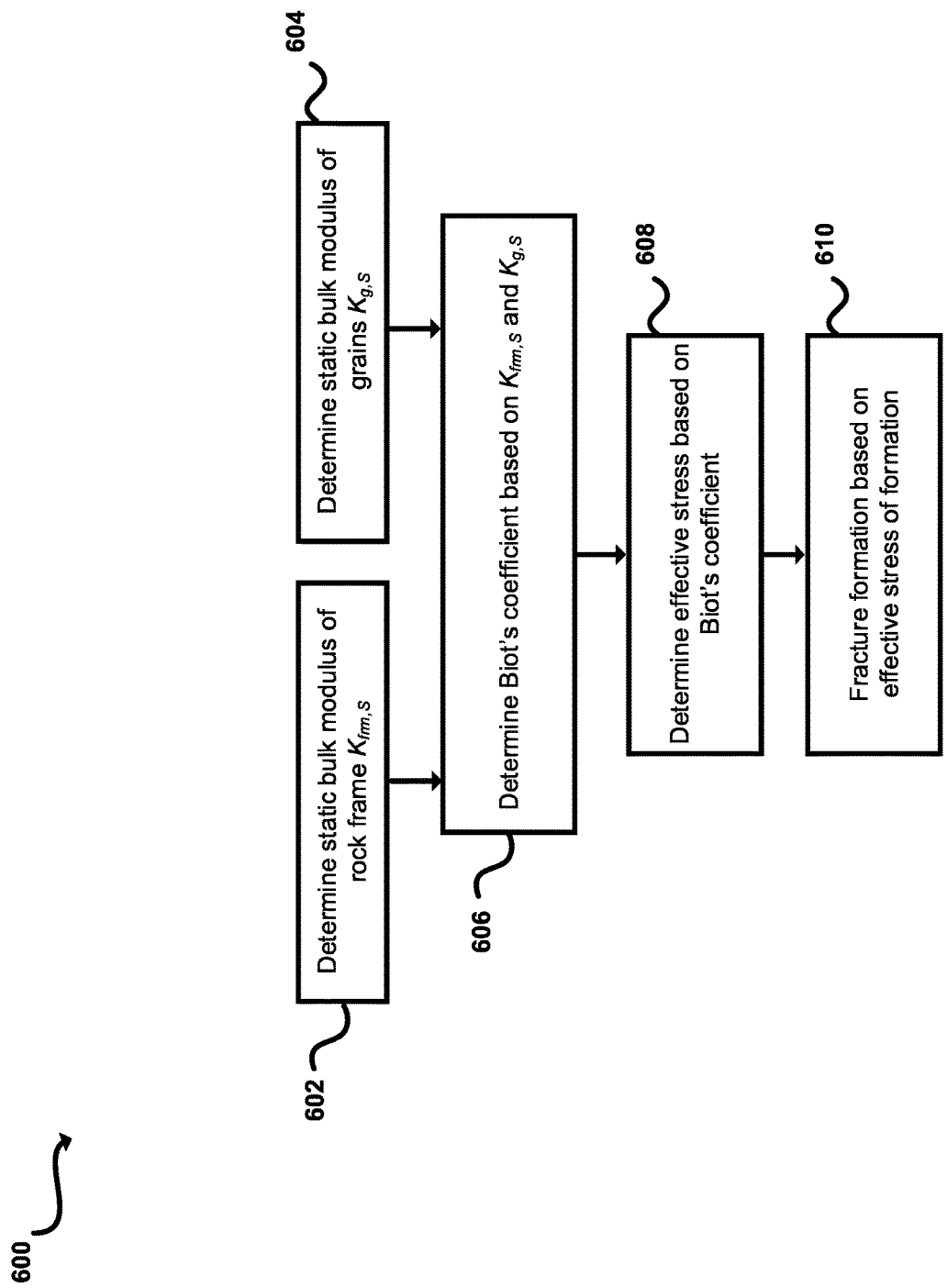
FIG. 6 illustrates an example method for hydraulic fracturing.

FIG. 6 illustrates an exemplary hydraulic fracturing method 600. In the method, the static bulk modulus of a rock frame $K_{frm,S}$ is determined 602, for example using the methods described herein. The static bulk modulus of grains $K_{g,S}$ is determined 604, for example using the methods described herein. Biot's coefficient is determined based on these determinations 606, for example using Equation 1. That is, Biot's coefficient equals $$\left(1 - \frac{K_{frm,S}}{K_{g,S}}\right).$$

The effective stress of the formation can then be determined 608, for example using Equation 1. In other words, the product of Biot's coefficient and the pore pressure is subtracted from the total or overburden stress to yield the effective stress of the formation.

The effective stress yields important information about the failure behavior of the formation. For instance, the pressure at which fluid must be pumped into the formation is based on the effective stress. Therefore, the formation can be fractured based on the effective stress of the formation 610 determined as described herein. For example, hydraulic fracturing pumps can be set at specified pressure settings based on the effective stress of the formation, thereby improving hydraulic fracturing operations. Other geomechanical applications are also improved with improved information about the effective stress of the formation. For example, determining the effective stress using the methods disclosed herein can be used to analyze wellbore stability or assess reservoir integrity during drilling, completion, and production.

Various steps discussed herein may be carried out as part of a computer implemented method. In embodiments, computer memory may include instructions that, when executed by at least one processor, carry out the steps of methods disclosed herein. Exemplary systems may include such memory and at least one processor. Exemplary systems may also include such memory and at least one processor and one or more hydraulic fracturing pumps. In embodiments, pressure settings for the one or more hydraulic fracturing pumps are set based on the effective pressure of a formation, which is determined based on methods disclosed herein.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for fracturing a porous formation, the system comprising:
   one or more hydraulic fracturing pumps to pump fluid into a porous formation at a pumping pressure;
   at least one processor;
   memory including instructions that, when executed by the at least one processor, cause the system to:
   determine a static bulk modulus of dry rock or rock frame in the porous formation from downhole data;

minimize a difference in static grain mineral bulk modulus values between a calculated static grain mineral bulk modulus and a measured static grain mineral bulk modulus;

determine a static bulk modulus of grain minerals in the porous formation from the difference in static grain mineral bulk modulus values;

determine Biot's coefficient for the porous formation based on the static bulk modulus of dry rock or rock frame and the static bulk modulus of grain minerals;

determine effective stress of the porous formation based on Biot's coefficient for the porous formation; and set the pumping pressure for the one or more hydraulic fracturing pumps at least in part based on the effective stress of the porous formation.

2. The system of claim 1, wherein the memory further includes instructions that, when executed by the at least one processor, cause the system to:

determine a plurality of acoustic velocity measurements for dry rock or rock frame; and wherein the static bulk modulus of the dry rock or rock frame is based at least in part on the plurality of acoustic velocity measurements.

3. The system of claim 1, wherein the memory further includes instructions that, when executed by the at least one processor, cause the system to:

determine a volumetric amount of minerals based on mineralogical measurements; and determine digenetic clay characteristics of minerals based on nuclear magnetic resonance (NMR) measurements.

4. The system of claim 3, wherein the static bulk modulus of grain minerals in the porous formation is determined at least in part based on the volumetric amount of minerals and the diagenetic clay characteristics of minerals.

5. The system of claim 1, wherein the memory further includes instructions that, when executed by the at least one processor, cause the system to:

determine pore pressure of the porous formation;

determine principal stresses of the porous formation; and wherein determining effective stress of the porous formation based on Biot's coefficient for the porous formation includes (i) determining the product of Biot's coefficient and pore pressure, and (ii) subtracting the product of Biot's coefficient and pore pressure from the externally applied total stress of the porous formation.

6. A method of fracturing a porous formation, the method comprising:

determining a static bulk modulus of dry rock or rock frame in a porous formation from downhole data;

minimizing a difference in static grain mineral bulk modulus values between a calculated static grain mineral bulk modulus and a measured static grain mineral bulk modulus;

determining a static bulk modulus of grain minerals in the porous formation from the difference in static grain mineral bulk modulus values;

determining Biot's coefficient for the porous formation based on the static bulk modulus of dry rock or rock frame and the static bulk modulus of grain minerals;

determining effective stress of the porous formation based on Biot's coefficient for the porous formation; and fracturing the porous formation by pumping a fluid into the porous formation at a pumping pressure, the pumping pressure set based at least in part on the effective stress of the porous formation.

7. The method of claim 6, further comprising:

determining a plurality of acoustic velocity measurements for dry rock or rock frame; and wherein the static bulk modulus of the dry rock or rock frame is based at least in part on the plurality of acoustic velocity measurements.

8. The method of claim 6, further comprising:

determining a volumetric amount of minerals based on mineralogical measurements; and determining digenetic clay characteristics of minerals based on nuclear magnetic resonance (NMR) measurements.

9. The method of claim 6, wherein the static bulk modulus of grain minerals in the porous formation is determined at least in part based on the volumetric amount of minerals and the diagenetic clay characteristics of minerals.

10. The method of claim 6, further comprising:

determining pore pressure of the porous formation;

determining principal stresses of the porous formation; and wherein determining effective stress of the porous formation based on Biot's coefficient for the porous formation includes (i) determining the product of Biot's coefficient and pore pressure, and (ii) subtracting the product of Biot's coefficient and pore pressure from the externally applied total stress of the porous formation.

11. A method comprising:

determining a static bulk modulus of dry rock or rock frame in a porous formation from downhole data;

minimizing a difference in static grain mineral bulk modulus values between a calculated static grain mineral bulk modulus and a measured static grain mineral bulk modulus;

determining a static bulk modulus of grain minerals in the porous formation from the difference in static grain mineral bulk modulus values;

determining Biot's coefficient for the porous formation based on the static bulk modulus of dry rock or rock frame and the static bulk modulus of grain minerals; and determining effective stress of the porous formation based on Biot's coefficient for the porous formation; and setting the pressure of one or more hydraulic fracturing pumps based on the effective stress of the porous formation.

12. The method of claim 11, further comprising:

determining a plurality of acoustic velocity measurements for dry rock or rock frame; and wherein the static bulk modulus of the dry rock or rock frame is based at least in part on the plurality of acoustic velocity measurements.

13. The method of claim 11, further comprising:

determining a volumetric amount of minerals based on mineralogical measurements; and determining digenetic clay characteristics of minerals based on nuclear magnetic resonance (NMR) measurements.

14. The method of claim 13, wherein the static bulk modulus of grain minerals in the porous formation is determined at least in part based on the volumetric amount of minerals.

15. The method of claim 13, wherein the static bulk modulus of grain minerals in the porous formation is determined at least in part based on the diagenetic clay characteristics of minerals.

16. The method of claim 11, further comprising:

determining pore pressure of the porous formation; and determining principal stresses of the porous formation.

17. The method of claim 16, wherein determining effective stress of the porous formation based on Biot's coefficient for the porous formation includes (i) determining the product of Biot's coefficient and pore pressure, and (ii) subtracting the product of Biot's coefficient and pore pressure from the externally applied total stress of the porous formation.

18. The method of claim 17, further comprising:
pumping fluid into the porous formation using the one or more hydraulic fracturing pumps.

19. The method of claim 17, further comprising performing a wellbore stability analysis based on the effective stress of the porous formation.

20. The method of claim 17, further comprising performing a reservoir integrity assessment based on the effective stress of the porous formation.

21. The system of claim 1, wherein the instructions further cause the system to:
determine the calculated static grain mineral bulk modulus based on mineral fraction and volumetric fraction; and
determine the measured static grain mineral bulk modulus based on hydrostatic tests.

\* \* \* \* \*